Nov. 1, 1949 W. L. VAN DOREN 2,486,893
BOX LIDDING MACHINE
Filed Oct. 18, 1946 9 Sheets-Sheet 6

INVENTOR
WILLIAM L. VAN DOREN
BY
Cook & Robinson
ATTORNEYS

Patented Nov. 1, 1949

2,486,893

UNITED STATES PATENT OFFICE 2,486,893

BOX LIDDING MACHINE

William Louis Van Doren, Wenatchee, Wash.

Application October 18, 1946, Serial No. 704,029

20 Claims. (Cl. 1—10)

This invention relates to machines known in the art to which they belong as "Box lidding machines," and it has reference more particularly to automatic machines for the placing of lids or covers on boxes, and their securement thereon, by means of staples or nails.

More specifically stated, the invention has to do with machines of a fully automatic character, designed for the conveyance of wooden boxes therethrough in rapid succession and the placing of lids on the boxes as they are conveyed, and finally the stapling of the lids in place by machines that operate to form the staples and to drive them.

It is the principal object of this invention to provide a fully automatic machine of the above kind of greater capacity than machines now in general use for the same purpose and which will do the work satisfactorily, and at a lesser operating cost.

Another object of the invention is to provide an improved machine of the above stated kind that will convey boxes in rapid succession therethrough; wherein there is a hopper for a supply of lids and a lid feed mechanism designed to be actuated by each box as it moves forward in the machine to extract a lid from the hopper and to place it on the box; devices to hold the lid in position on the box for its securement as the assembled box and lid pass beneath the stapling heads and devices actuated by the moving box to time the energization of the stapling machines and to determine the number and intervals between driven staples.

It is also an object of this invention to provide means whereby the box conveyor devices will be momentarily stopped during the staple driving periods.

Yet another object of the invention is to provide simple and effective means whereby the spacing of staples, and the number of staples to be used in any box may be regulated.

Still another object of the invention is to provide a machine that may be readily and easily adjusted to accommodate it to receive boxes of different widths and of different heights.

Other objects of the invention reside in the details of construction of parts; in the combination of parts and in the mode of operation of the machine, as will hereinafter be fully described.

In accomplishing these and other objects of the invention, I have provided the improved details of construction, the preferred forms of which are illustrated in the accompanying drawings, wherein.

Briefly described, the machine of the present invention comprises a frame structure on which the driving motor, its controls, box conveyors, lid hopper, lid feed devices, and stapling machines are supported and operated for the conveyance of boxes through the machine in rapid succession and the securing of the lids thereon.

The lid hopper is supported above the conveyor, at the receiving or front end of the machine, and it is designed to contain a substantial supply of box lids, and at opposite sides of the conveyor, are lid feed devices adapted to be engaged by each passing box and to be moved therewith in a manner to effect the extraction of a lid from the hopper and the registering of the extracted lid on the top of the box as it advances.

Near the discharge end of the machine, at opposite sides of the conveyors and above the box and its lid, are the stapling machines and these are motor driven and operated under control of a timing device that is actuated by each box in passing. In the present instance I employ stapling machines that both form and drive the staples into the lids to secure them to the boxes, but it is fully anticipated that, in lieu of the present stapling machines, nailing machines might be used in the same manner and controlled by the same means to nail the lids on the boxes.

Referring more in detail to the drawings:

In its present preferred form of construction, the machine comprises a horizontally disposed base frame structure which is fabricated, for the most part, from angle iron members, and upon which frame the conveyors, staple forming and driving heads, lid hopper and lid extractor devices, and other essential parts, are mounted.

Figures 2, 2A, 2B:
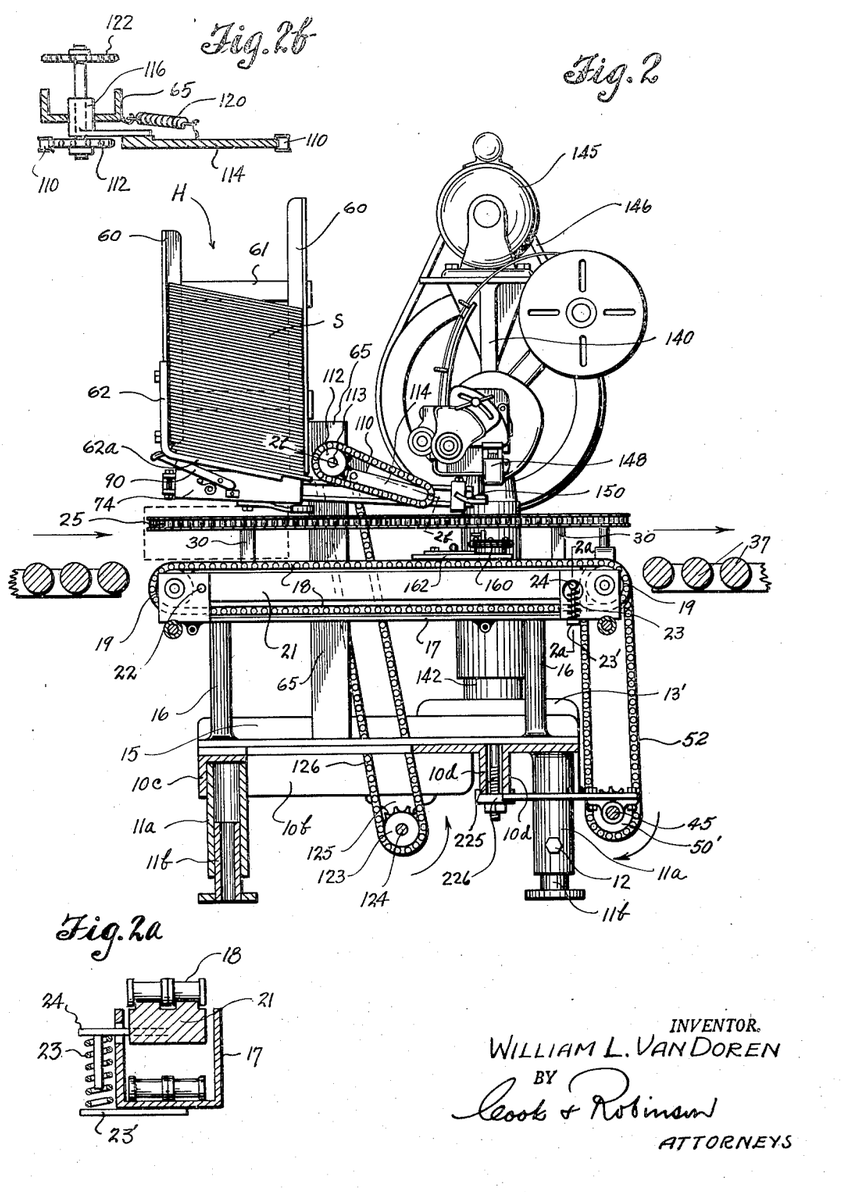
Fig. 2 is a longitudinal section of the machine taken on the vertical plane of line 2—2 in Fig. 1.
Fig. 2a is a cross section on line 2a—2a in Fig. 2.
Fig. 2b is a section on line 2b—2b in Fig. 2.
Figure 3:
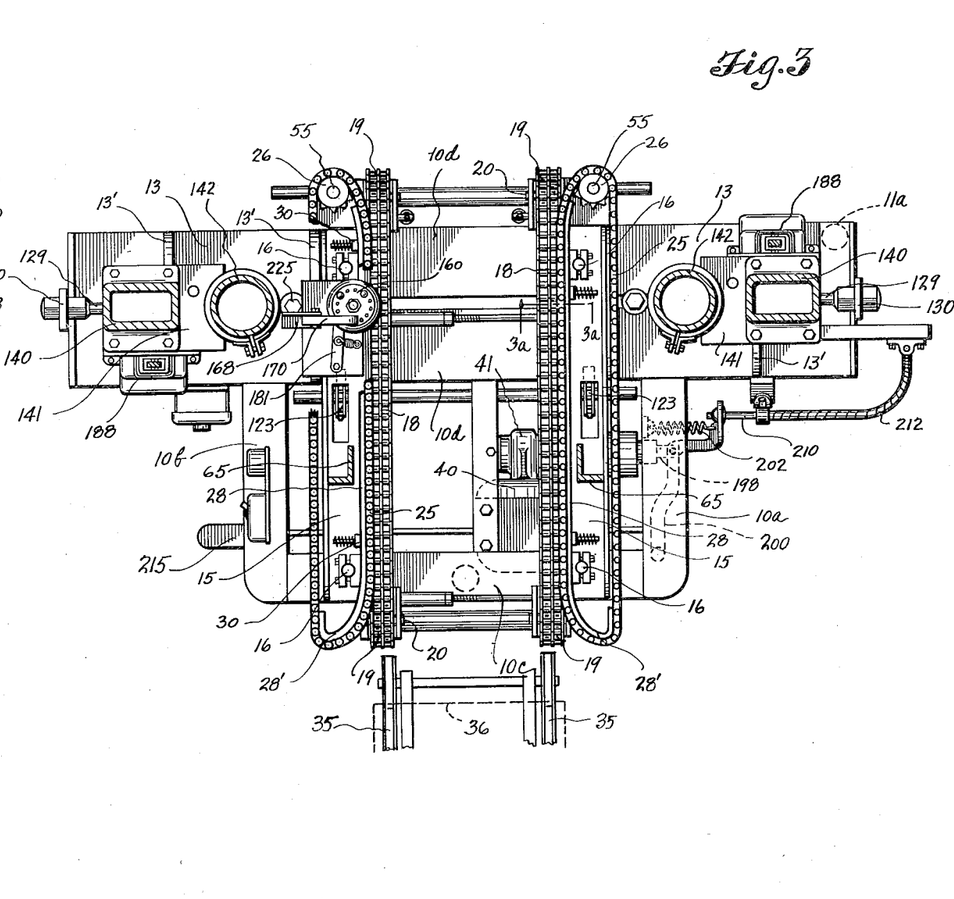
Fig. 3 is a horizontal section, taken substantially on line 3—3 in Fig. 1.

As best shown in Figs. 2 and 3, the base frame comprises two parallel, substantially spaced opposite side beams 10a and 10b of angle iron, joined rigidly together across the receiving end of the machine by an angle iron beam 10c. At their other ends, these beams are welded to one of a pair of rigidly joined cross beams 10d—10d, also of angle iron form, and placed back to back in spaced relationship, as observed best in Fig. 2; the end portions of these cross beams being extended equally to opposite sides of the frame structure and serve for the support thereon of the staple driving machines as will presently be fully explained.

The base frame is supported by three legs of adjustable length; one leg being located centrally beneath the cross beam 10c and fixed thereto and the other two legs being located beneath and at opposite ends of the cross beams 10d and are fixed rigidly thereto.

As shown best in Fig. 2, each leg comprises a tubular upper portion 11a that is rigidly welded or otherwise fixed to the frame structure and a telescopically contained lower end portion 11b adapted to be held at any selected position of extension by a set screw 12 threaded through the lower end portion of the part 11a. This adjustment provides for levelling the machine and for raising or lowering to accommodate it to the conveyors that may be used to bring boxes to and deliver them from the machine, or for other reasons.

Supported upon the outer end portions of the paired, transverse beams 10d and 10d, and symmetrically located at opposite sides of the longitudinal center of the frame, are pedestal bases 13 and 13 which support thereon the stapling machines later described. Each pedestal base has vertical up-turned flanges 13' along its inner and outer edges and fixed to the inner flanges of these two pedestal bases, and overlying the base frame in its longitudinal directions, are parallel and coextensive angle iron beams 15 and 15; each of which has vertical posts 16 fixed thereto near its forward and rearward ends, as shown in Fig. 2.

Supported by these posts at each side of the longitudinal center of the machine, are inwardly facing angle iron beams 17 and 17. These are held rigidly in parallel relationship and at the same horizontal level by cross members 17x, as in Fig. 4 and extend from the receiving to the discharge end of the machine as illustrated in Fig. 3.

Mounted at the inside of each of the beams 17 and extending to the full length thereof are paired conveyor chain belts 18 that operate at opposite ends of the beams about paired supporting sprocket wheels 19. Each pair of these sprocket wheels is fixed on a short, horizontal shaft 20, and these are mounted at their ends in U-shaped end portions of the beams 17, as shown best in Fig. 4. These two pairs of conveyor chain belts 18 operate in parallel planes and are driven in unison by means presently described, and in the direction indicated by the arrows adjacent thereto in Fig. 3.

It is shown in Figs. 2 and 2a, that rails 21 are extended lengthwise of the belts 18 as roller trackways for the upper runs of the belts, to prevent any sag therein, and to give a substantial support for the boxes carried thereon in their passage beneath the stapling heads. The rails 21 have ends pivotally supported as at 22 in Fig. 2, on their supporting beams 17 and at their other ends are yieldingly supported by springs 23 that are carried upon brackets 23' that extend from the corresponding beams 17 and which springs press upwardly against pins 24 that extend horizontally from the rails as shown in Fig. 2a.

Operating in a horizontal plane and at opposite sides and slightly above the paired conveyor chains 18—18, are coacting conveyor belts 25 and 25. At the discharge end of the machine, these conveyor belts operate, respectively, about driving sprocket wheels 26 and 26 and at the receiving end of the machine, they operate about the rounded nose portions 28' of guide rails 28 that extend along the inner runs of the belts as supporting and presser means therefor.

Figure 3A:
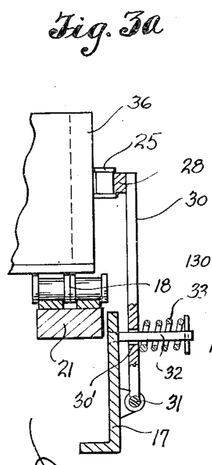
Fig. 3a is an enlarged cross sectional detail of the conveyer, taken on line 3a—3a in Fig. 3.

It is shown in Figs. 2 and 3a that each of the rails 28 is supported at near its opposite ends by a pair of legs 30—30 that are hingedly fixed at their lower ends, as at 31 in Fig. 3a, to the corresponding beam 17. Rods 32 are fixed in the beams and extend through holes 30' in legs, and coiled springs 33 are mounted about these rods to press inwardly against the legs, thus to yieldingly press the rails against the inner runs of the belts to hold them firmly against the ends of the boxes as conveyed between them.

Boxes to be lidded are brought to the machine on a pair of conveyor chains 35 as shown in Figs. 2 and 3, or by other suitable means. In these views the boxes are shown in dotted lines and are designated by reference character 36. It is shown, also, that the boxes 36 pass directly from the conveyor chains 35 onto the top runs of the conveyor chains 18—18 and between the paired conveyor belts 25—25 to be conveyed and guided thereby, with straight line accuracy, through the machine and discharged onto conveyor rolls 37 for conveyance from the machine. It will here be mentioned that it is not required that the boxes be in any definite or regular spacing in passing through the machine.

The means for driving the several conveyor chains comprises an electric motor 40 that is fixed to the under side of the frame structure 10, at the receiving end of the machine as shown in Fig. 3. The motor 40 operates through a gear reduction mechanism 41, shown best in Fig. 16, a shaft 42 driven thereby and a clutch mechanism 43, shown in Fig. 18 and later more fully described, to drive a sprocket wheel 44 that is rotatably mounted on the shaft 42.

Figure 17:
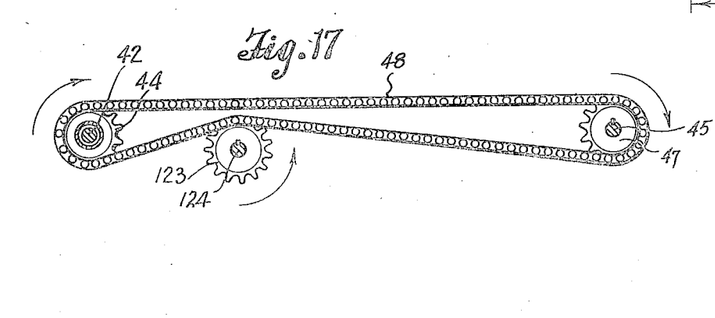
Fig. 17 is a vertical section on line 17—17 in Fig. 16.

Supported horizontally across the discharge end of the machine is a shaft 45, revolubly contained in supporting bearing 46 and 46', fixed to the frame structure 10. Keyed on the shaft 45 between the bearings, is a sprocket wheel 47 located in alinement with the sprocket wheel 44, and a sprocket chain belt 48 operates about the sprocket wheels 44 and 47, as shown in Fig. 17, to drive the shaft 45. Keyed on opposite end portions of shaft 45 that extend beyond the bearing 46 and 46' are sprocket wheels 50 and 50'. These are alined with sprocket wheels 51 and 51' (Fig. 4) that are keyed on the outer ends of the mounting shafts 20 which carry the sprocket wheels 19 at the discharge end of the machine over which the conveyor chains 18 operate. Chain belts 52—52' operate about the alined sprockets 50—51 and 50'—51' as seen in Fig. 4, thus to drive all belts 18 and 25 in unison.

Figure 4:
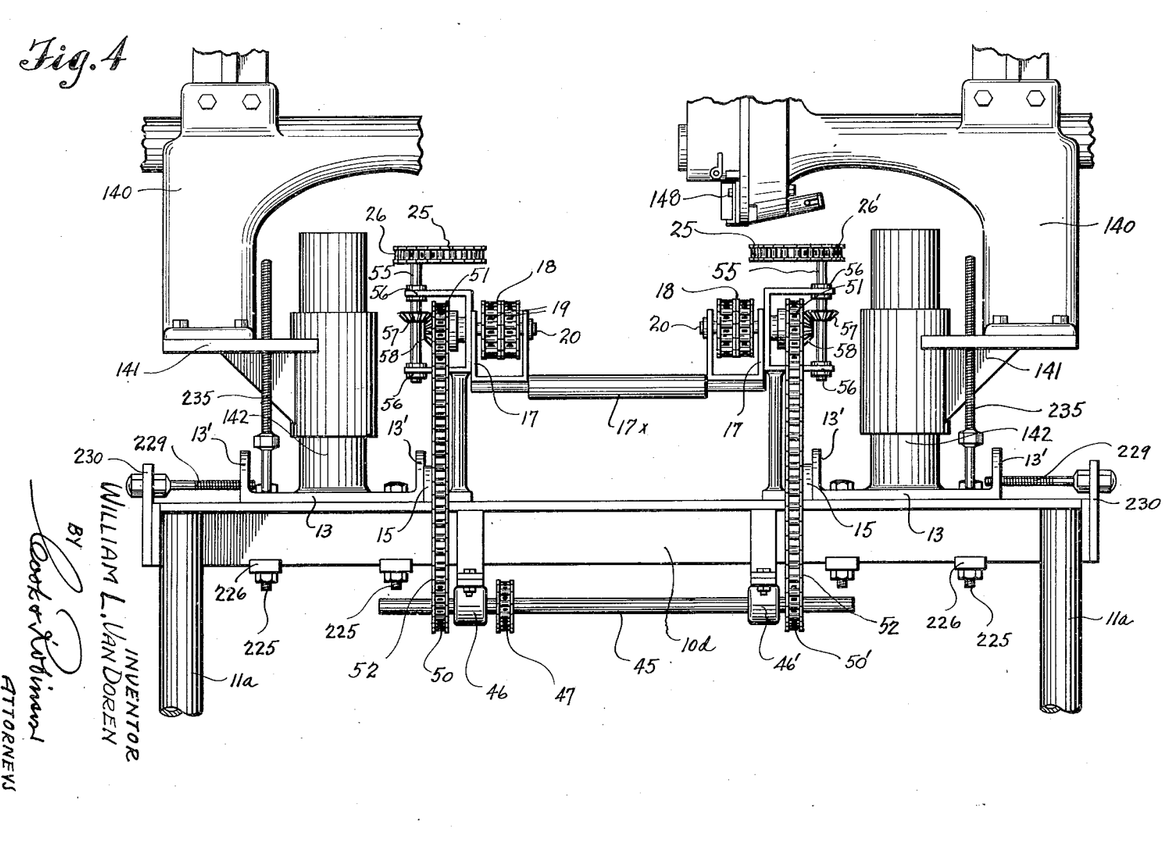
Fig. 4 is a somewhat enlarged elevation of a part of the machine as seen from the discharge end, or what may be referred to as the "back end" of the machine.

The sprocket wheels 26 and 26' about which the conveyor belts 25 and 25 extend, are supported by vertical shafts 55, revolubly mounted in vertically spaced bearings 56 and 56 fixed to the beams 17, as noted in Fig. 4, and fixed on each of these shafts is a bevel gear 57 meshing with a beveled gear 58 on the end of the adjacent drive shaft 20 of the corresponding conveyor chain 18. It is to be understood that the gearing arrangement here is such as to cause the conveyor chain belts 18—18 and 25—25 to travel at the same rate, and in the same direction to cooperate in the delivery of boxes through the machine.

Figures 1, 1A:
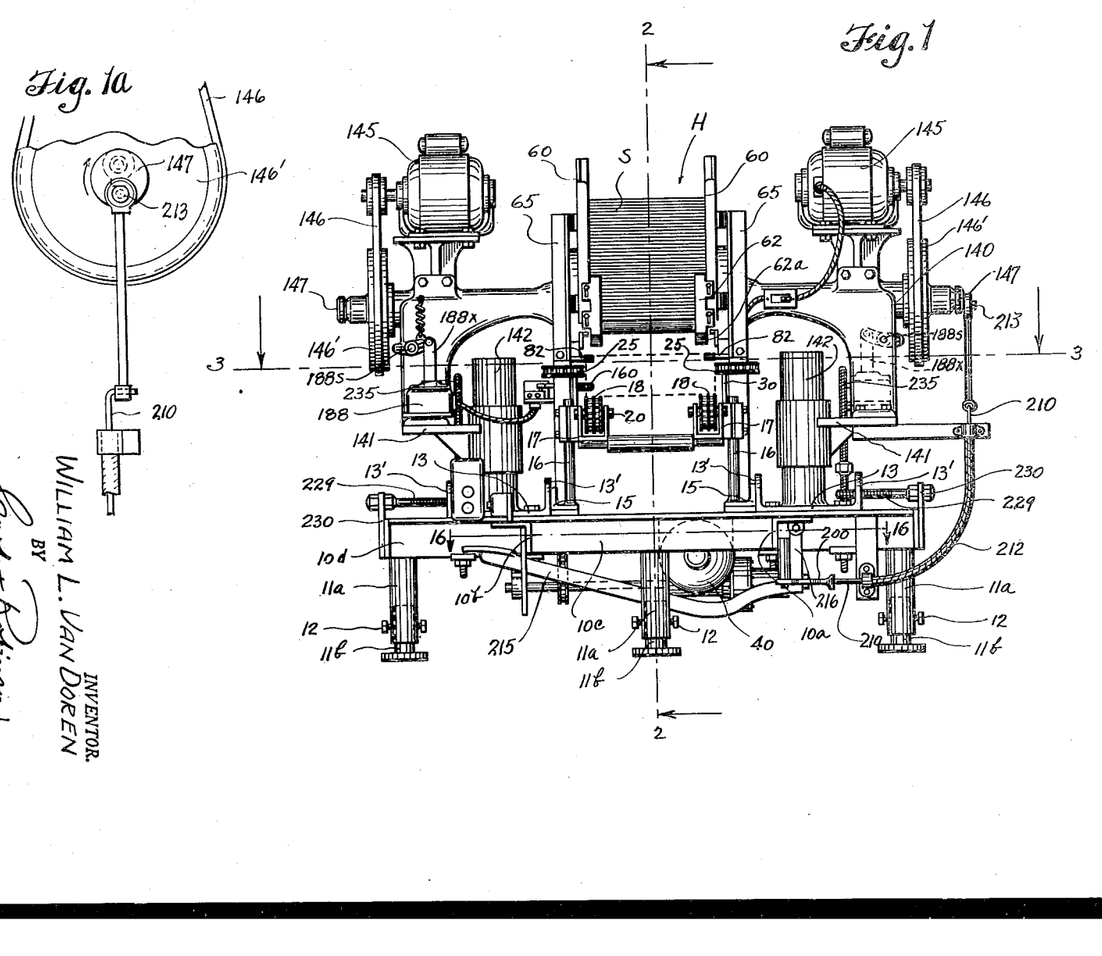
Fig. 1 is an elevation of the present box lidding machine as seen from the box receiving end, or what may be referred to as the "front end" of the machine.
Fig. 1a is a view of the conveyor drive clutch releasing eccentric, shown in elevation.

It is shown in Figs. 1 and 2 that a hopper H is provided at the receiving end of the machine for containing a stack of box lids. This stack, designated at S is located directly over the path of travel of the entering boxes. The hopper comprises the four, vertical corner bars 60, joined rigidly by connecting bars 61 to form a rectangular frame in which the stack of lids is contained for downward gravity feed. Note in Fig. 2 that the width of the hopper is such as to retain the lids in a downwardly and forwardly inclined position. At its lower end, the lid stack is adapted to be supported in the hopper by a pair of bars 62—62 that are fixed to the front corner beams of the hopper and have inclined portions 62a that extend beneath the end portions of the stack as best shown in Figs. 2 and 6. It is shown in Figs. 5 and 6, that these parts 62a terminate short of the rear wall of the hopper and also that the rear corner bars 60 terminate at their lower ends sufficiently short of the plane of the parts 62a that the lowermost lid may be extracted from the hopper directly beneath them by pushing it in the direction of travel of the boxes.

The hopper structure, in its entirety, is supported rigidly at a proper elevation, by angle iron posts 65—65 that are fixed rigidly upon the angle beams 15—15 at opposite sides of the chain conveyors, and extend vertically, along the outside of the beams 17—17 and are secured to the hopper frame.

Figures 5, 7:
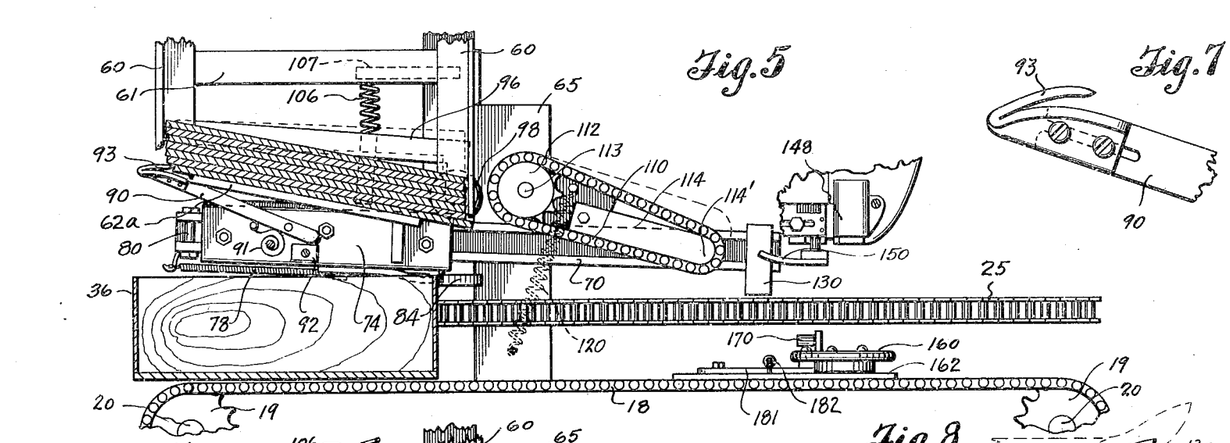
Fig. 5 is an enlarged elevation of parts associated with the box conveyor chains, lid hopper and lid extractor devices, showing a box as entering the machine and the relationship of the lid extractor devices thereto.
Fig. 7 is an enlarged view of the end portion of one of the lid extractor levers.
Figures 6, 8:
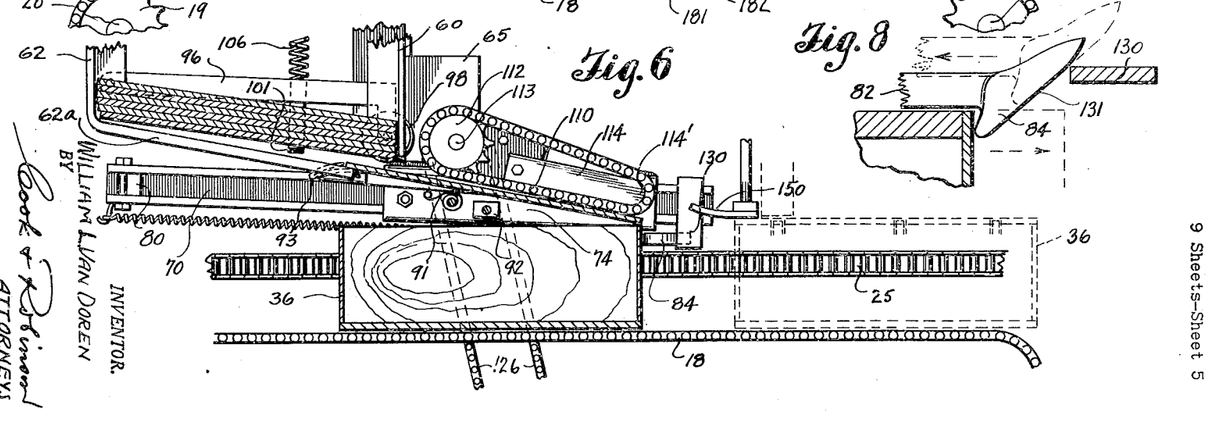
Fig. 6 is a similar view of parts, but showing the box in a farther advanced position and a lid as being extracted from the hopper and applied to the box.
Fig. 8 is a detail, in plan view, of the end portion of one of the box engaging dogs of the lid extractor mechanism, showing it as entering back of its release plate to disengage it from the advancing box.
Figures 9, 10, 11:
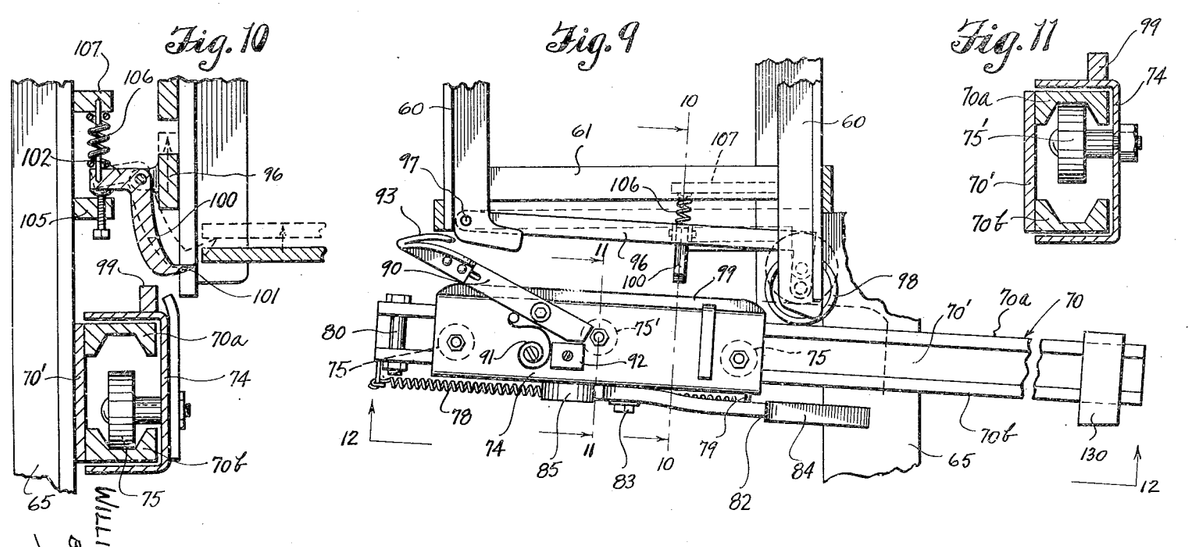
Fig. 9 is an enlarged, elevational view of a part of the lid feed mechanism, showing the extractor slide in a retracted position.
Fig. 10 is a vertical section, taken on line 10—10 in Fig. 9, and showing a lid stack supporting dog.
Fig. 11 is a vertical section taken on line 11—11 in Fig. 9.

The feed mechanism whereby the lids are extracted, one at a time from the lower end of the lid stack and placed on the boxes, will be best understood by reference to Figs. 9 and 10 viewed in connection with Figs. 5 and 6.

At each side of the path of travel of the boxes there is a trackway 70, fixed to the corresponding hopper supporting post 65. These trackways extend parallel with the conveyor belts from positions approximately even with forward side of the hopper to some distance beyond the rearward side. Also, they are located above the level of the conveyed boxes and slope slightly downward, as noted in Fig. 9. Each trackway comprises a back plate 70' as shown in Fig. 10, along the top and bottom edges of which channel rails 70a and 70b are fixed. Mounted for travel along each of the trackways is a lid extractor slide 74 of substantial length and of channel form in cross section, designed to extend along and to receive the trackway therein as will best be understood by reference to Fig. 10. Mounted on each slide plate near its ends, are supporting rollers 75 and 75, arranged for travel upon the lower channel rail 70b of the corresponding track and there is a similar roller 75' mounted on the slide between its ends designed to engage against the under side of the top rail 70a of the trackway thus to hold the slide firmly in place in its travel along the trackway. Coiled springs 78 are attached under tension to hooks 79 on the forward ends of the slides, and to hooks on the front ends of the trackways to normally retain the slides in retracted positions, as is the slide in Fig. 9. Stops are provided, as at 80, to definitely limit the retraction of the slides.

Figure 12:
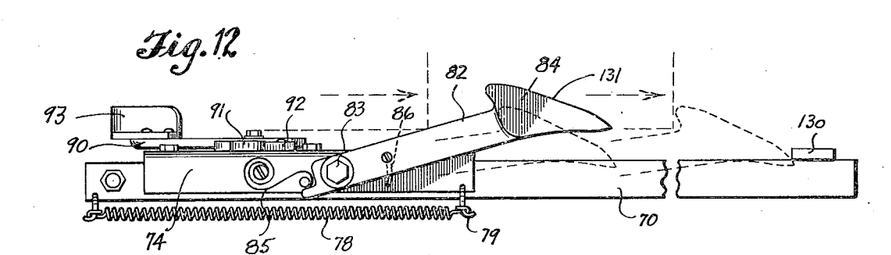
Fig. 12 is a section taken on line 12—12 in Fig. 9, showing the extractor slide dog.

In accordance with the showing Figs. 9 and 10, a box engaging dog 82 is fixed to the slide 74 at each side of the conveyor. Each dog is in the form of a lever arm, pivotally fixed at one end to the bottom flange of the corresponding slide, by a bolt 83, and extended forwardly and inwardly therefrom. At its swinging end the lever has an inwardly directed hook portion 84. Springs 85 are mounted on the slides, as seen in Fig. 12, to so bear against the levers as to yieldingly urge the hooked ends of the dogs inwardly, that is, toward the center line of the machine to a definite position; the lever having a pin and slot connection with the slide, as at 86, to limit its movements.

It is to be understood that the relationship of the slides 74—74 to the boxes 36 as conveyed beneath the hopper and through the machine is such that as each box reaches that position beneath the hopper in which the box is shown in Fig. 5, the hooks 84 of the dogs at opposite sides will be engaged by the forward wall of the box, and the slides will then be caused to advance along their trackways with the box.

Mounted on each slide 74 is a lid extractor lever 90, pivotally attached at one end to the slide, and extending upwardly and toward the front of the machine, as seen in Figs. 5 and 9. Springs 91 are fixed to the slides in a manner to press against the extractor levers to yieldingly hold them in raised positions, each with its inner end engaged against a limit stop block 92. At their upper ends the extractor levers have hook-like fingers 93 adjustably attached thereto as noted in Fig. 9. The arrangement of the extractor levers on the slides at opposite sides of the machine is such that, as the slides start forwardly with an advancing box, the fingers 93 will simultaneously engage the back edge of the lowermost lid in the hopper, as has been shown in Fig. 5. Then, with the advancement of the slides 74, the engaged lid will be extracted from the stack. The arrangement of parts is such that the lid will be guided onto the top of the box in exact registration thereon, and ready for securement by the stapling machines.

In order that the lid being extracted may be relieved of the weight of the stack of lids above it, I have provided stack lifting hooks at opposite sides of the hopper, which, with the forward travel of the slides, will be engaged with the next lid above that being extracted and the stack slightly lifted thereby. This lifting means will be best understood by reference to Figs. 9 and 10 wherein it is indicated that a stack lifting lever 96 is provided at each side of the hopper. The levers 96 are located above the level of the trackways, and lengthwise thereof, and each is pivotally fixed to the hopper by a pivot bolt 97 through its forward end portion, and is equipped at its other end with a supporting roller 98. The length of each lever 96 is such that when the corresponding slide 74 is in its retracted position, as in Fig. 9, the roller 98 will rest upon the trackway 70 ahead of the slide, but as soon as the slide starts to travel along the trackway under the influence of an entering box, the roller 98 will ride upon a rail 99 that is fixed longitudinally to the top flange of the slide, thus to lift the lever 96 to a raised position, as seen in dotted lines in Fig. 9.

Pivotally attached, as shown in Fig. 10, to each lever, 96, is a hook 100 having a depending leg equipped with a sharpened, inturned point 101, at its lower end and an outwardly directed arm 102 at its upper end. When the lever 96 is in its lowered position, as prior to the forward advancement of the slide by an entering box, the arm 102 engages a fixed stop 105 on the hopper support and this retains the hook point 101 disengaged from the lid stack, but when the lever 96 is moved upwardly, with the forward advance of the slide and the passing of the roller 98 onto the rail 99 of the slide, a spring 106 mounted by a bracket 107 to press downwardly against the arm causes the hook to swing inwardly, first to engage with the lid that is next to the lower end of the stack, then to lift and support the stack as the lower lid is being extracted by the extractor fingers.

As each lid is extracted from the lower end of the stack, it is guided onto and pressed into contact with the top of the box by means of presser chain belts 110 located at opposite sides of the conveyors directly above the box ends and extending in the direction of travel of the boxes, as observed in Figs. 5 and 6.

Figures 16, 18:
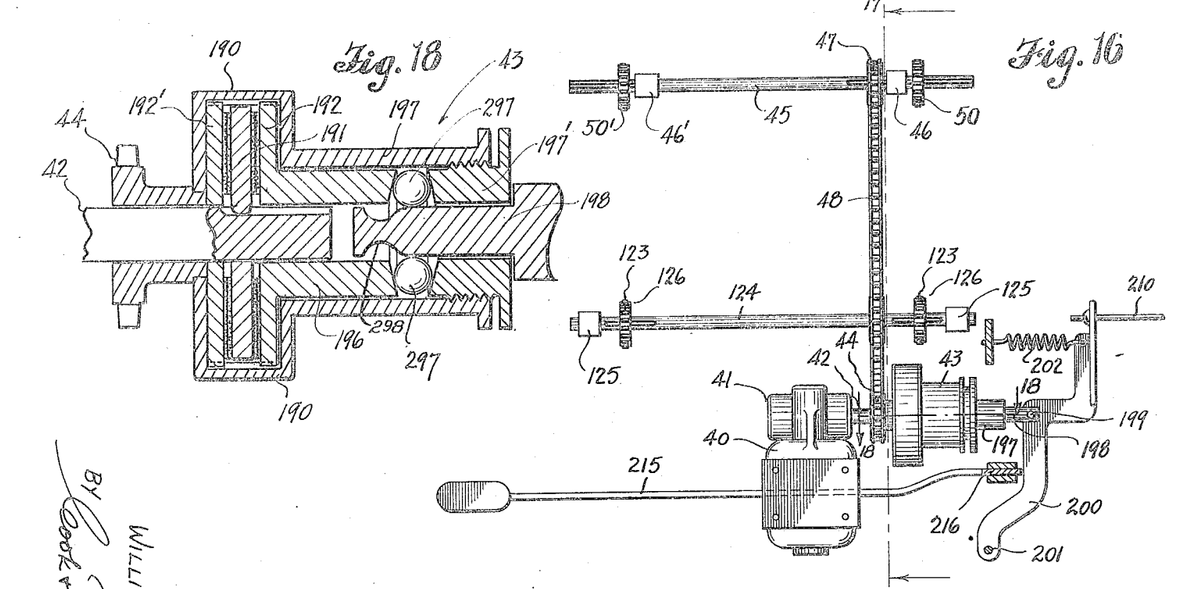
Fig. 16 is a plan view of the driving motor, conveyor shafts that are driven thereby and some of the conveyor clutch release devices as seen on line 16—16 in Fig. 1.
Fig. 18 is an enlarged sectional detail of the driving clutch mechanism associated with the motor, as seen on line 18—18 in Fig. 16.

Each belt 110 extends at one end about a driven sprocket wheel 112 on a supporting and driving shaft 113 and at its other end about the rounded nose portion 114' of an arm 114 that is pivotally carried on the sprocket wheel supporting shaft 113. It is shown best in Figs. 2 and 2b that the sprocket wheel supporting and driving shaft 113 extends outwardly and rotatably through a bearing 116 in the hopper supporting post at that side of the conveyor, and that the arm 114 is pivoted on the shaft at the inside of the post, and a coiled spring 120 is attached to the arm and to the post to pull the arm downwardly. On the outer end of shaft 113 is a driving sprocket wheel 122, Fig. 2b, and the wheels 122, Figs. 2 and 16, at opposite sides of the conveyor, are aligned with sprocket wheels 123 on the opposite end portions of a cross shaft 124, carried below the base 10 in bearings 125 and chain belts 126 operate about the aligned sprockets 122 and 123. It is shown in Figs. 16 and 17 that a sprocket wheel 127 is fixed on the cross shaft 124 and it is engaged by the belt 48 to drive the cross shaft 124 thus through the belts 126, to drive each of the lid presser belts 110 so that they will press the lids into place on the boxes, but will not drag on the lid.

As each box in its advancement reaches a position, shown in Fig. 6, at which the rear edge of the lid is ready to drop from the hopper onto the box, the hook portions of the box engaging dogs, mounted on the extractor slides 74, enter back of release plates 130 that are fixed to the forward ends of the trackways. The hook portions have inclined cam surfaces, as at 131 in Fig. 8, which ride against the plates and thus move the hooks outwardly and release the dogs from the box. Then the coiled springs 78 pull the slides back to starting position in readiness for their pick-up by the next entering box.

The staple forming and driving machines are located at opposite sides of the path of travel of the boxes and each comprises a frame structure 140 mounted upon a bracket 141 that is vertically adjustable upon a pedestal or post 142 that is erected upon the corresponding pedestal base 13. The frame 140 of each machine mounts an electric motor 145 thereon, as shown in Fig. 1, and the motor has a belt connection, as at 146, with a belt wheel 146' revoluble on a horizontal drive shaft 147 that is the main drive shaft of the machine and which has operative connection with the staple forming and driving head 148.

As boxes with lids applied thereon are successively conveyed through the machine, their opposite end portions directly beneath the driving heads 148 and on each head a presser shoe 150 is fixed to engage in sled-runner fashion with and ride upon the box lid as the box is advanced to nailing position, as will be understood by reference to Figs. 5 and 6.

It will be here explained that applicant makes no claim, per se, to the stapling machine. It is anticipated to use one like or similar to the machine shown in U. S. Patents 1,760,863 or 1,760,031 to H. G. Allen and the timing devices herein used which control the staple driving operations are of a specific design that takes into consideration the fact that with each rotation of the drive shaft 147, Figs. 1 and 20 the machine operates to form and drive one staple. The machine further is characterized by the fact that each staple driving operation is completed with one turn of shaft 147 and the shaft stops at a definite position after each staple driving operation and must be energized for the next operation by the setting of a driving clutch that is automatically released when the operation is completed. The means for accomplishing this will be further described later in the description.

Figure 13:
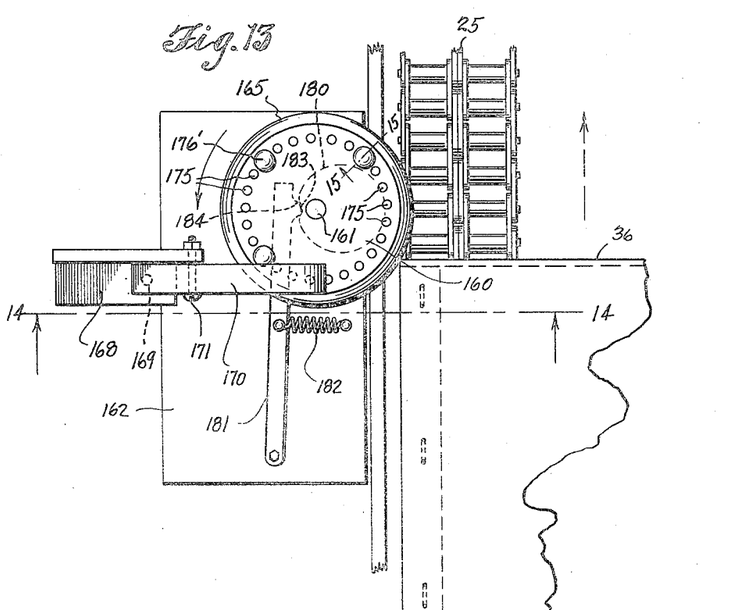
Fig. 13 is an enlarged plan view of the friction wheel used in the means for timing the energization of the stapling machines.
Figures 14, 15:
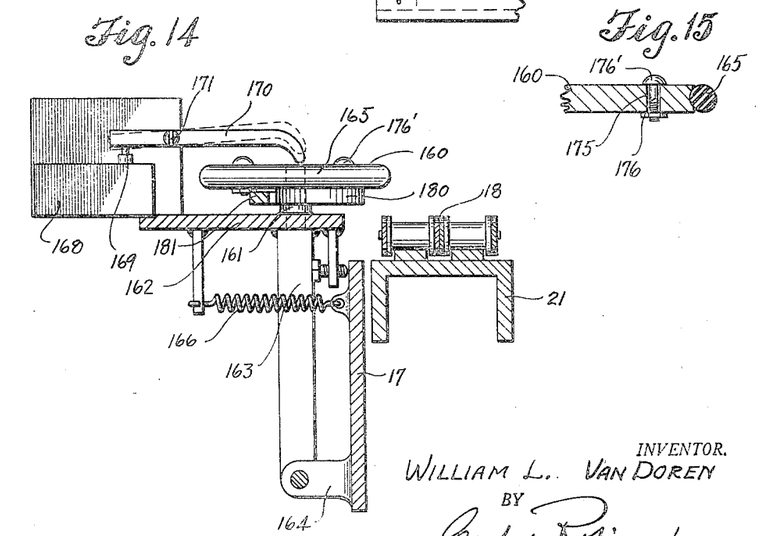
Fig. 14 is a sectional view of the same, taken on line 14—14 in Fig. 13.
Fig. 15 is an enlarged sectional view taken on line 15—15 in Fig. 13.

In accordance with the object of providing a novel means for controlling the stapling operations, I have provided a timing device, the details of which are best shown in Figs. 13 and 14, and the device in general is shown in Fig. 3 in its relationship to the conveyor.

The timing device comprises a friction wheel 160 (Figs. 3 and 4) adapted to revolve on a vertical stub axle 161 fixed on a horizontal plate 162. The plate is fixed rigidly upon a post 163 that is pivoted at its lower end on an arm 164 extended laterally from the corresponding beam 17, as shown in Fig. 14. The wheel has a rubber tire 165 and the location of the wheel is such that as each box is advanced to the stapling machine, an end wall thereof engages the wheel rim and causes the wheel to be rotated as the box advances. A spring 166 attached under tension to the post 163 and to the rail 17 holds the wheel in tight contact with each box in passing.

Supported from the plate 162 is a micro-switch 168 having a circuit closing button 169 extended upwardly therefrom, directly beneath the inner end of a switch actuating lever 170. The lever has a pivotal support, as at 171, between its ends and its outer end overlies the wheel 160. Formed in the wheel is a concentric circle of closely formed holes 175, in selected ones of which studs 176 may be secured as in Fig. 15. These studs have rounded heads 176' at their upper ends adapted, with the turning of the wheel, to engage the lever 170 to rock it to momentarily close the micro-switch. Each time the switch is thus closed the stapling machines are energized through means presently explained, and each drives one staple and then stops.

The wheel 160 is of such diameter that it will be caused to make approximately one turn for each box. However, an indexing cam wheel 180 is fixed eccentrically to the wheel on its under side as shown in Fig. 13, and a lever arm 181 is pivoted at one end on plate 162 and its other end is tightly pressed against the cam by a spring 182 in such manner as to automatically return the wheel to a definite starting position after each box passes it. The cam has a notch 183 at its lowest point, in which a lug 184 on the lever will seat thus to yieldingly retain the wheel exactly at the starting position. Thus, it will be understood that by the particular places of inserting the studs in the wheel, the location and the spacing of staples as driven in the box may be determined.

As shown in Fig. 13, three studs are used, and this means that with the passing of each box, three staples will be driven. If more or less are desired, then more or less studs would be applied to the wheel.

Figures 19, 20:
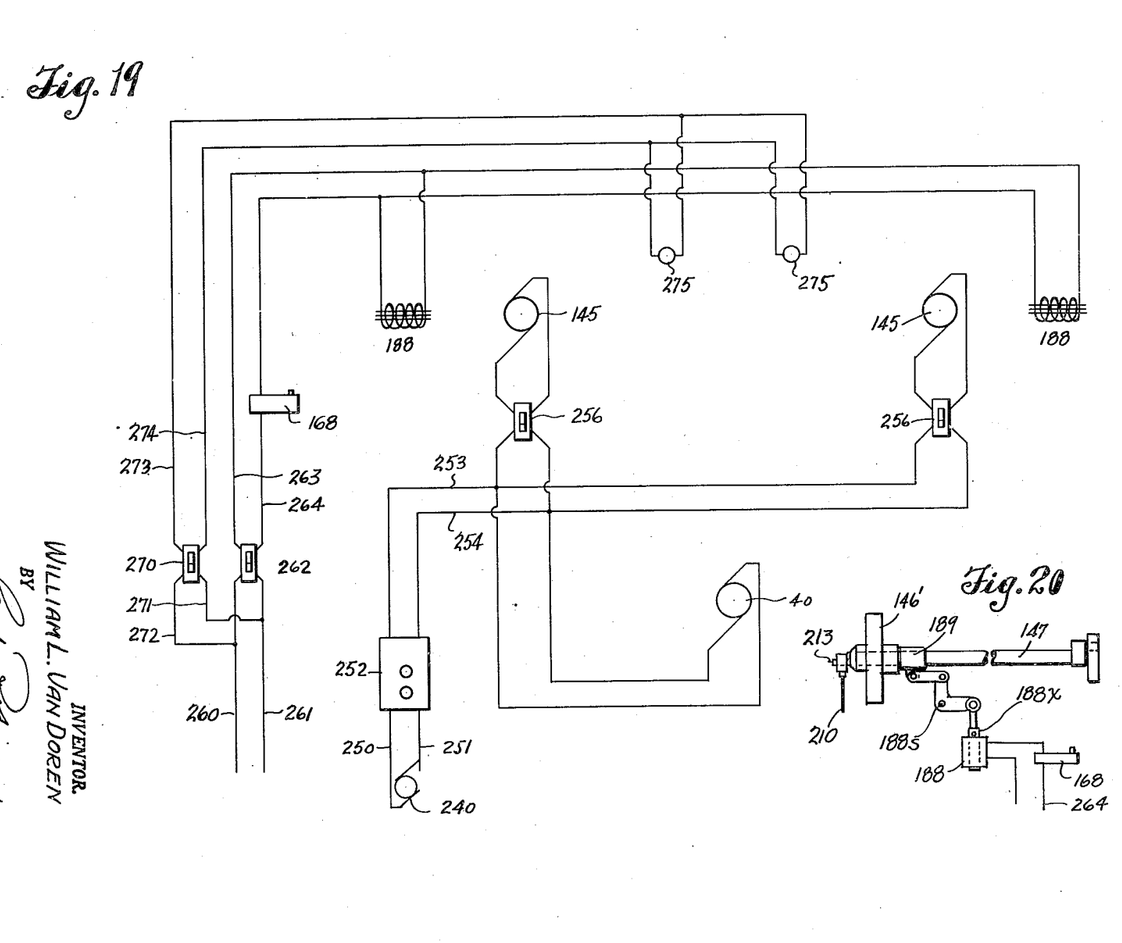
Fig. 19 is a wiring diagram for the electrical equipment of the machine.
Fig. 20 is a detail of the staple driving machine diagrammatically illustrating its driving clutch and clutch setting mechanism.

It will further be explained, in connection with the stapling machines, that the machine driving motors 145 operate continuously, but the driving connections between motors and their drive shafts 147 which actuate the staple driving heads of the machines are effected only upon the engaging of the normally disengaged driving clutches of the machines; and this is effected by the energization of solenoids 188—188, shown in connection with the two machines in Fig. 3. These solenoids are electrically connected in a circuit as shown in Fig. 19, that is momentarily closed with each closing of the micro-switch 168. The momentary energization of the two solenoids shifts their core bars 188x, and these are operatively connected with clutch actuating shafts 188s, for the setting of clutches. The shifting of the clutches sets the machines in motion to rotate their drive shafts 147 through one turn only; the clutches being automatically disengaged when this operation is completed. The fact that the shafts 147 make but one turn for each operation is important in the use of means now to be described for stopping of the box conveyors during each stapling operation to insure the straight driving and to avoid bending the staple.

In Fig. 16 it is shown that the motor 40 operates through the reduction gear mechanism 41, the shaft 42, clutch 43, sprocket 44, and belt 48 to drive the shaft 45 which in turn drives the box conveyors. The drive shaft 42 mounts the sprocket wheel 44, but the driving connection of wheel 44 with the shaft 42 is effected through the normally engaged clutch mechanism designated generally at 43 in Fig. 16 and shown in sectional detail in Fig. 18. The clutch mechanism comprises a housing 190 that is mounted on and is revoluble about the shaft 42, and the sprocket wheel 44 is fixed to the housing coaxial of the shaft.

Located within the clutch housing and keyed on the shaft 42, is a clutch disk 191, and keyed to the housing and located at opposite sides of disk 191 are disks 192—192'. The disk 192 has a hub portion 196 that is fitted rotatably on the end portion of shaft 42 and by which hub the clutch disks may be pressed together to effect a driving connection that will cause the housing 190 to turn with the shaft 42 and thus to drive the gear 44.

As seen in Fig. 18, the housing 190 has a tubular hub portion 197 coaxial of shaft 42 and containing the hub 196 therein. Applied to the hub 197 is a fitting 197' within which a short shaft 198 is slidably fitted to extend outwardly from the hub. The adjacent end surfaces of the hub 193 and the fitting 197' are conically sloped in opposite directions and ball bearings 297 are contained between them and normally held in place by the shaft 198 thus to cause the clutch to be applied to drive the sprocket 44. Formed in shaft 198 is an annular channel 298, and when shaft 198 is pulled outward to a certain extent, the ball bearings will move into the channel and thus permit the hub 196 to shift outwardly and the clutch to be disengaged.

At its outer end the shaft 198 has a pivoted connection, as at 199 in Fig. 16, with the medial portion of a lever 200. The lever, in turn, is pivotally attached at one end by a bolt 201 to the base frame structure and at its other end has a spring 202 attached thereto under tension and normally holding the clutch engaged, thus to cause the conveyor chains to be driven.

It is shown also in Figs. 1, 1a and 16, that a flexible shaft 210 is connected to the swinging end of lever 200 and is extended through a guide tube 212 supported from the frame to a location below the drive shaft 147 of one of the stapling heads. Fixed in the end of the shaft is an eccentric pin 213 to which the end of the flexible shaft 210 is connected by a pitman or link 213.

When the shaft 147 starts to turn (refer to Fig. 1a) the eccentric pulls on the flexible shaft 210 and in this way acts on lever 200 to momentarily release the clutch 43 and momentarily stop the forward driving of the conveyors. As the eccentric rotates back to starting position, the pull on shaft 210 is released and under pull of spring 202 the lever 200 is actuated to again engage the clutch and the conveyers started. This takes place with every staple driving operation and stops the movement of the box while each staple is being driven.

If it is desired to stop the machine at any time, the driving clutch mechanism 43 may be manually released by depressing one end of a foot pedal shown in Figs. 1 and 16, as comprising a horizontal portion 215 and a vertical leg 216 at one end by which it is pivotally suspended from the base frame. The leg is so disposed as to engage against the lever 200, and when the lever portion 215 is depressed, this actuates the lever 200 to release the clutch.

In order that the machine may be readily adapted for use with boxes of different height and widths, I provide for an adjustment in spacing of the parts at opposite sides of the longitudinal center of the machine, and also in the elevation of the stapling heads and hopper mechanism above the conveyers.

It is seen in Figs. 2 and 4 that the pedestal bases 13 rest flatly upon the cross beams 10d—10d and may be anchored at any set spacing by means of bolts 225 that extend downwardly through the bases and between the paired beams 10d—10d, as in Fig. 2, and are anchored in cross plates 126 that engage against the lower edges of these beams. When the anchor bolts are loosened, the adjustment may be made by the turning of adjusting screws 229 that have ends rotatably fixed in brackets 230 secured to the ends of the beams, and threaded through the upturned outer edge flanges 13' of the bases, as best shown in Fig. 4.

The beams 15—15 are fixed to the bases 13—13 and therefore when the bases are adjusted they carry with them the conveyor chains and their supports.

The stapling machines are likewise carried on the brackets 141 and these are adjustable vertically on the pedestal posts by a vertical adjusting screw 235, to accommodate the heads to boxes of different depths.

The wiring diagram of Fig. 19 shows the apparatus to be supplied with electric current from a source of supply 240 through wires 250—251 under control of a switch 252. From the switch, line 253 and 254 are extended and branch lines from these lead to the motor 40 that drives the box conveyors, and other branch lines lead to the motors 145—145 that drive the stapling heads. Individual control switches 256 are provided for the motors 145.

Current is likewise supplied through lines 260—261 to control switch 262 from which lines 263 and 264 lead and to which the solenoids 188—188 are connected in series. The micro-switch 168 is shown as interposed in line 264 to control the energization of both solenoids for the starting of the stapling machines. A lighting circuit is taken off of wires 260—261 and controlled by switch 270. This comprises the wires 271—272 leading to the switch and lines 273—274 leading beyond the switch and to which lights 275 are connected.

The operation of the machine through a complete cycle would be as follows:

Assuming that the box lids have been properly stacked in the hopper H, and that the lid feeding slides are in retracted positions, and that boxes are being conveyed in successsion to the machine: As each box enters the machine beneath the hopper, its forward wall engages with the hooks 84 of the feed slides, and causes the slides to advance in unison with the box, and in doing so, to extract a lid from the hopper and to place the lid on the box. The pressure chain belts 110 urge the lid ends down against the end walls of the box as the lid advances with the box beneath the shoes 150. As the box moves into position beneath the staple driving means, an end wall engages with and rotates the wheel 160 that causes the energization of the staple driving means and the intermittent stop periods of the box conveyor as the staples are driven.

The energization of the staple driving means is effected by the setting of their driving clutches through the energization of the solenoids 188—188 upon each closing of micro-switch 168. With each turning of the drive shafts 147 of the staple driving machines, the conveyor driving clutch 43 is momentarily disengaged through the mediacy of the eccentric 213, and cable 210, to stop advancement of the conveyor during the staple driving periods. Thus the boxes are not being advanced while the staples are being driven.

As each box is advanced to the staple driving machine with lid applied thereto, the hooks 84 are disengaged from the box and the lid feeding slides return to retracted positions in readiness for the next incoming box.

It will be mentioned further with respect to the staple driving means employed, that no specific claim is made thereto per se, except as an element in the combination of conveyors and controls. Any other machine which operates to drive a staple or nail and which can be operated in the same or substantially the same manner would be satisfactory insofar as satisfying the combination is concerned. It is anticipated in this connection also that nails might be employed in lieu of staples and that any of the well-known types of nailing machines might be employed in place of the machines here shown.

I claim:

1. A box lidding machine comprising, in combination, means for the conveyance of boxes along a definite path of travel, a hopper located above the path of travel of said boxes for containing a supply of box lids, a movable extractor means disposed for functional actuation by each conveyed box in passing the hopper to effect the extraction of a lid therefrom and its application to the box in position for its securement thereto, and a staple driving means operable under control of the boxes in passing to effect the stapling of the applied lids to the boxes.

2. A box lidding machine comprising, in combination, means for the positive conveyance of boxes in succession along a definite path of travel, a hopper disposed directly above the path of travel for the support of a supply stack of lids therein, a lid extractor means reciprocally movable along the path of travel, devices on the extractor means adapted to be engaged by successively entering boxes to move the extractor means with each box to effect the extraction of a lid from the hopper and its application to the box for securement thereto, spring means for retracting the slide after each extracting operation, a staple driving means, and a control device therefor operable by each box in passing to cause the staple driving means to staple the applied lids to the boxes.

3. A box lidding machine comprising, in combination, a guideway and means for the positive conveyance of boxes in succession along said guideway from the receiving side to the discharge side of the machine, a hopper for the support of a supply stack of lids directly above the guideway at the said receiving side, staple driving means adjacent the guideway at the discharge side of the machine, lid extractor slides reciprocally movable along the guideway and operable by each entering box to effect the extraction of a lid from the hopper and its application to the box for securement thereto, means for pressing the ends of an applied lid against its box as they are advanced to the stapling means, and a device operable by each box in passing to time the staple driving operations of the said stapling means.

4. A box lidding machine comprising, in combination, traveling conveyor belts operable for the conveyance of boxes thereon in succession along a defined path of travel, a hopper for the support of a supply of box lids above the path of travel, a reciprocally movable extractor means adapted to be functionally actuated by each box in passing beneath the hopper to effect the extraction of a lid from the hopper and its disposition upon the box for securement thereto, a stapling means, and means operable under control of each box in passing the stapling means to cause the latter to drive staples at pre-determined intervals of spacing into the lid to secure it to the box.

5. A box lidding machine comprising, in combination, traveling conveyor belts operable for the conveyance of boxes thereon in succession along a defined path of travel, a hopper for the support of a supply of box lids above the path of travel, a reciprocally movable extractor means adapted to be functionally actuated by each box in passing beneath the hopper to effect the extraction of a lid from the hopper and its disposition upon the box for securement thereto, and a staple driving means adjacent each side of the path of travel and a device operable under control of each box in passing between said staple driving means to cause them to drive staples at pre-determined intervals of spacing into the lid to secure it at the opposite ends to the box.

6. A box lidding machine comprising in combination, conveyor belts operable for the conveyance of boxes in succession along a definite path of travel, driving means for the belts, a hopper for the support of a stack of lids above the path of travel, a reciprocally movable extractor means adapted to be functionally actuated by each box in passing beneath the hopper to effect the extraction of a lid therefrom and its disposition upon the box for securement thereto, a staple driving means, means operable under control of each box in passing the staple driving means to cause it to drive staples to secure the lid to the box, and means operable by the staple driving means for stopping the conveyor belts during each staple driving operation.

7. In a machine of the character described, in combination, a staple driving means including a driven shaft, a normally disengaged clutch and an electrically energized means for engaging the clutch to set the staple driving means in motion for each staple driving operation, a driven conveyor for the conveyance of boxes with lids assembled thereon in succession past the staple driving means, and means operable by each box in passing the stapling means to energize the clutch setting means to effect the stapling of the lid to the box.

8. In a machine of the character described, in combination, a staple driving means including a driven shaft, a normally disengaged clutch and means adapted to be electrically energized to engage the clutch to set the said staple driving means in motion for each staple driving operation, a normally traveling conveyor belt for the conveyance of boxes with lids assembled thereon past the stapling means, means operable by each box in passing the staple driving means to energize the first mentioned means to engage the clutch to set the staple driving means in motion for stapling the lid to the box, and means operable incident to the energization of the staple driving means to stop the box conveyor belt during the staple driving operation only.

9. In a box lidding machine, in combination, a staple driving means including a drive shaft, a normally disengaged driving clutch and a timing device adapted to be electrically energized to engage the said clutch to set the machine in motion for each staple driving operation, a conveyor belt on which boxes with lids assembled thereon may be advanced in succession past the staple driving means, a driving means for said conveyor belt including a normally engaged clutch, means operable by contact therewith of each box in passing the staple driving means to energize the timing device to set the first mentioned clutch to effect a staple driving operation of the staple driving means, and means actuated by the staple driving means upon its energization, to disengage the second mentioned clutch to stop the conveyor and travel of the box while the staple is being driven.

10. In a box lidding machine, in combination, a staple driving means including a drive shaft, a normally disengaged driving clutch and a timing device adapted to be electrically energized to engage the said clutch to set the said staple driving means in motion for each staple driving operation, a conveyor belt on which boxes with lids assembled thereon may be advanced in succession past the staple driving means, a driving means for said conveyor belt including a normally engaged clutch, means operable by contact therewith of each box in passing the staple driving means to energize the timing device to set the first mentioned clutch to effect a staple driving operation of the staple driving means, an eccentric on the said drive shaft of the staple driving means, and means actuated by said eccentric with the rotation of the drive shaft to momentarily disengage the second mentioned clutch to stop the advancement of the box during each staple driving operation.

11. In a box lidding machine, in combination, a staple driving means including a drive shaft, a normally disengaged driving clutch therefor, a relay adapted to control the setting of said clutch, an electric circuit for the relay, a normally open switch for said circuit, a conveyor for the conveyance of boxes with lids assembled thereon past the staple driving means, a wheel supported for rolling contact with each box in passing the staple driving means, and means operable by the turning of said wheel to momentarily close the switch to set the clutch for one staple driving operation.

12. In a box lidding machine, in combination, a staple driving means including a drive shaft, a normally disengaged driving clutch therefor, a relay adapted to effect the setting of the clutch, an electric circuit for the relay, a normally open control switch in said circuit having an actuating member, means for the conveyance of boxes with lids assembled thereon past the staple driving means, a friction wheel mounted for engagement with each box in its passing the staple driving means for rolling contact therewith, and devices on said wheel in angular spacing to successively engage the switch actuating member for the periodic closing of said switch to set the clutch for the timing of successive staple driving operations for the securement of the lid on the box.

13. A combination as recited in claim 12 wherein said friction wheel is formed with a concentric circular row of holes therein, and said devices on the said wheel are in the nature of studs designed to successively engage with the switch actuating member as the wheel is rotated by each box to determine both the spacing of the driven staples and their location in the lid of the box.

14. A combination as recited in claim 12 wherein said friction wheel is formed with a concentric circular row of holes therein, and said devices on the said wheel are in the nature of studs designed to successively engage with the switch actuating member as the wheel is rotated by each box to determine both the spacing of the driven staples and their location in the lid of the box and means associated with the said wheel whereby it is brought to a definite starting position incident to the passing of each box.

15. In a machine of the character described, the combination with a belt conveyor for the conveyance of boxes successively along a definite path of travel, a hopper located above said path of travel for containing a supply stack of lids therein for gravity down-feed, means for the support of the stack in the hopper with its lower end at a pre-determined position; of a lid extractor means comprising trackways located at opposite sides of the path of conveyance of boxes, slides mounted for reciprocal travel along said trackways, springs attached under tension to the slides and hopper to return the slides to retracted positions, hooks attached to the slides in position to engage with the forward edge of each box as advanced by the conveyor to move the slides forwardly therewith, fingers on the slides designed to cooperatively engage with the rear edge of the lower lid in the stack for its extraction from the hopper by the forward travel of the slides, means for guiding the extracted lid onto the box, and means for disengaging the said hooks from the box after the lid has been assembled with the box.

16. A combination as recited in claim 15 including also means operable with the forward travel of the extracting slides to engage and lift the stack of lids free of the lid being extracted.

17. A combination as recited in claim 15 including also cam rails on the slides, levers pivotably mounted on the hopper at opposite sides of the lid stack, hooks on the levers adapted to engage the stack with the upward actuation of said levers to lift the stack free of the lid being extracted, and means on the levers arranged to be engaged by said cam rails as the slides move forward to actuate the levers upwardly.

18. A combination as recited in claim 15 including also cam rails on the slides, levers pivotably mounted on the hopper at opposite sides of the lid stack, hooks on the levers adapted to engage the stack with the upward actuation of said levers to lift the stack free of the lid being extracted means on the levers arranged to be engaged by said cam rails as the slides move forward to actuate the levers upwardly, and means for disengaging the said hooks from the stack upon return of the slides to retracted positions.

19. A machine of the character described comprising a frame structure, a guideway, conveyor belts for the positive delivery of boxes in succession along the guideway, a hopper above the guideway for a stack of lids, extractor slides mounted for reciprocal travel at each side of the guideway and beneath the hopper, means on the slides adapted to engage each box as advanced and to be moved therewith for the extraction of the lowermost lid from the stack and its placement on the box, staple driving means at opposite sides of the guideway and between which the boxes with lids assembled thereon are advanced by the conveyor, means between the hopper and staple driving means for pressing the lids into position on the boxes for securement, means controlled by each of the moving boxes and common to both staple driving means for determining the spacing and driving of the staples, and means controlled by one of the staple driving means to stop the box conveying means for the driving of the staples.

20. A machine as recited in claim 19 wherein the staple driving means are adjustably mounted for change in spacing and elevation to accommodate boxes of different size.

WILLIAM LOUIS VAN DOREN.

REFERENCES CITED

The following references are of record in the file of this patent:

UNITED STATES PATENTS

| Number | Name | Date |
| --- | --- | --- |
| 2,148,037 | Randall | Feb. 21, 1939 |
| 2,228,134 | Ecklund | Jan. 7, 1941 |
| 2,305,419 | Harred | Dec. 15, 1942 |
| 2,378,948 | Paxton | June 26, 1945 |